(12) United States Patent
Cerny et al.

(10) Patent No.: US 7,786,993 B2
(45) Date of Patent: *Aug. 31, 2010

(54) ENVIRONMENT MAPPING

(75) Inventors: Mark Evan Cerny, Los Angeles, CA (US); Pal-Kristian Engstad, Los Angeles, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 797 days.

This patent is subject to a terminal disclaimer.

(21) Appl. No.: 11/222,207

(22) Filed: Sep. 7, 2005

(65) Prior Publication Data

US 2006/0001674 A1    Jan. 5, 2006

Related U.S. Application Data

(63) Continuation of application No. 10/267,341, filed on Oct. 8, 2002, now Pat. No. 7,046,245.

(60) Provisional application No. 60/328,490, filed on Oct. 10, 2001.

(51) Int. Cl.
*G06T 15/50* (2006.01)
(52) U.S. Cl. ............... 345/426; 345/419; 345/581; 345/582
(58) Field of Classification Search ............ 345/422, 345/426, 582, 589
See application file for complete search history.

(56) References Cited

U.S. PATENT DOCUMENTS

| 4,241,341 A | 12/1980 | Thorson |
| 4,361,850 A | 11/1982 | Nishimura |
| 4,646,075 A | 2/1987 | Andrews |
| 4,658,247 A | 4/1987 | Gharachorloo |
| 4,709,231 A | 11/1987 | Sakaibara |
| 4,737,921 A | 4/1988 | Goldwasser |
| 4,817,005 A | 3/1989 | Kubota |
| 4,866,637 A | 9/1989 | Gonzalez-Lopez |
| 4,901,064 A * | 2/1990 | Deering .............. 345/426 |
| 4,943,938 A | 7/1990 | Aoshima |

(Continued)

FOREIGN PATENT DOCUMENTS

JP    06-266854    9/1994

(Continued)

OTHER PUBLICATIONS

Foley et al , Computer Graphics: Principales and Practice, Second Edition in C, p. 731.*

(Continued)

*Primary Examiner*—Xiao M. Wu
*Assistant Examiner*—Abderrahim Merouan
(74) *Attorney, Agent, or Firm*—Carr & Ferrell LLP

(57) ABSTRACT

A system and method for environment mapping determines a computer-generated object's reflective appearance, based upon position and orientation of a camera with respect to the object's location. An embodiment of the present invention is implemented as a real-time environment mapping for polygon rendering, however, the scope of the invention covers other rendering schemes. According to one embodiment of the present invention, a vector processing unit (VPU) uses a modified reflection formula—$r = e - (e \cdot (n+e_o))(n+e_o)/(1-nz) = e - (e \cdot [nx, ny, nz-1])[nx, ny, nz-1]/(1-nz)$, wherein $e_o = [0, 0, -1]$, and $nx$, $ny$, and $nz$ are the components of the surface normal vector n—to compute reflective properties of an object.

23 Claims, 5 Drawing Sheets

U.S. PATENT DOCUMENTS

| | | | |
|---|---|---|---|
| 5,064,291 A | 11/1991 | Reiser | |
| 5,222,203 A | 6/1993 | Obata | |
| 5,268,996 A | 12/1993 | Steiner | |
| 5,369,737 A | 11/1994 | Gholizadeh | |
| 5,448,687 A | 9/1995 | Hoogerhyde et al. | |
| 5,537,638 A | 7/1996 | Morita | |
| 5,550,960 A | 8/1996 | Shirman | |
| 5,555,532 A | 9/1996 | Lucas | |
| 5,563,989 A | 10/1996 | Billyard | |
| 5,659,671 A * | 8/1997 | Tannenbaum et al. | 345/426 |
| 5,673,374 A | 9/1997 | Sakaibara | |
| 5,704,024 A * | 12/1997 | Voorhies et al. | 345/426 |
| 5,734,384 A | 3/1998 | Yanof | |
| 5,748,865 A | 5/1998 | Yamamoto et al. | |
| 5,751,928 A | 5/1998 | Balalash | |
| 5,756,354 A | 5/1998 | Tzidon | |
| 5,760,781 A | 6/1998 | Kaufman | |
| 5,761,401 A | 6/1998 | Kobayashi | |
| 5,774,124 A | 6/1998 | Itoh et al. | |
| 5,781,194 A | 7/1998 | Ponomarev | |
| 5,805,782 A | 9/1998 | Foran | |
| 5,808,619 A | 9/1998 | Choi | |
| 5,812,141 A | 9/1998 | Kamen | |
| 5,831,623 A | 11/1998 | Negishi | |
| 5,912,830 A | 6/1999 | Krech, Jr. | |
| 5,914,724 A | 6/1999 | Deering | |
| 5,935,198 A | 8/1999 | Blomgren | |
| 5,949,424 A | 9/1999 | Cabral et al. | |
| 6,034,691 A | 3/2000 | Aono et al. | |
| 6,034,693 A | 3/2000 | Kobayashi | |
| 6,037,947 A | 3/2000 | Nelson | |
| 6,081,274 A | 6/2000 | Shiraishi | |
| 6,141,013 A | 10/2000 | Nelson | |
| 6,175,367 B1 | 1/2001 | Parikh | |
| 6,181,384 B1 | 1/2001 | Kurashige | |
| 6,208,347 B1 | 3/2001 | Migdal et al. | |
| 6,229,553 B1 | 5/2001 | Duluk, Jr. et al. | |
| 6,252,608 B1 | 6/2001 | Snyder | |
| 6,268,875 B1 | 7/2001 | Duluk, Jr. et al. | |
| 6,313,842 B1 | 11/2001 | Tampieri | |
| 6,330,000 B1 | 12/2001 | Fenney | |
| 6,342,885 B1 | 1/2002 | Knittel | |
| 6,400,842 B2 | 6/2002 | Fukuda | |
| 6,426,755 B1 | 7/2002 | Deering | |
| 6,476,807 B1 | 11/2002 | Duluk, Jr. et al. | |
| 6,504,538 B1 * | 1/2003 | Freund et al. | 345/426 |
| 6,577,312 B2 | 6/2003 | Deering et al. | |
| 6,597,363 B1 | 7/2003 | Duluk, Jr. et al. | |
| 6,611,265 B1 | 8/2003 | Hong | |
| 6,639,594 B2 | 10/2003 | Zhang et al. | |
| 6,664,955 B1 | 12/2003 | Deering | |
| 6,664,959 B2 | 12/2003 | Duluk et al. | |
| 6,686,924 B1 | 2/2004 | Mang | |
| 6,717,576 B1 | 4/2004 | Duluk, Jr. et al. | |
| 6,717,579 B1 * | 4/2004 | Deslandes et al. | 345/428 |
| 6,753,870 B2 | 6/2004 | Deering et al. | |
| 6,771,264 B1 | 8/2004 | Duluk et al. | |
| 6,778,181 B1 | 8/2004 | Kilgariff et al. | |
| 6,781,594 B2 | 8/2004 | Day | |
| 6,825,851 B1 | 11/2004 | Leather | |
| 6,850,236 B2 | 2/2005 | Deering | |
| 6,850,243 B1 | 2/2005 | Kilganiff et al. | |
| 6,854,632 B1 | 2/2005 | Larsson | |
| 7,079,138 B2 | 7/2006 | Day | |
| 7,589,723 B2 * | 9/2009 | Wang et al. | 345/426 |
| 2001/0048434 A1 * | 12/2001 | Brown | 345/426 |
| 2002/0080136 A1 | 6/2002 | Kouadio | |
| 2002/0130866 A1 * | 9/2002 | Stuttard | 345/426 |
| 2003/0043163 A1 * | 3/2003 | Day | 345/589 |
| 2003/0112238 A1 | 6/2003 | Cerny et al. | |
| 2004/0056860 A1 * | 3/2004 | Collodi | 345/426 |
| 2005/0001836 A1 * | 1/2005 | Day | 345/426 |

FOREIGN PATENT DOCUMENTS

| | | |
|---|---|---|
| JP | 10-055454 | 2/1998 |
| JP | 2000-137828 | 5/2000 |
| WO | 01/29768 A | 4/2001 |

OTHER PUBLICATIONS

Voorhies D et al. "Reflection Vector Shading Hardware", Computer Graphics Proceedings. Annual Conference Series 1994. Siggraph 94 Conference Proceedings, ACM, 1994, pp. 163-166, New York, NY, USA.

Blinn J F et al, "Texture and Reflection in Computer Generated Images", Communications of the Association for Computing Machinery, ACM, Oct. 1, 1976, pp. 542-547, vol. 19, No. 10, New York, NY, USA.

Foley et al., "Computer Graphics: Principles and Practice," Oct. 1996, pp. 721-745.

Agui, Takeshi et al., "Computer Graphics," Shokodo Co., Ltd., Jul. 1992, 1st ed., p. 80-101 (Environment Mapping).

Konma, Toshihiro, "Rendering and Texture: Introduction to CG Creation in the Multimedia Age," Nikkei Bus. Pub., Inc., Nov. 1996, p. 237 (Bump Mapping).

Matsushita, Yasuyuki, "Special Effects: Interobject Reflection Effect: Starting OpenGL Programming with Mesa 3D," Itsutsubachi Res. Co., Ltd., Jan. 2000, pp. 148-153.

Möller, T & Haines, E., "Real-time rendering," 1999, p. 69-81, A.K. Peters Ltd.

Schlick, C., "A Survey of Shading and Reflectance Models," Computer Graphics Forum, Jun. 1994, p. 121-132, vol. 13, No. 2.

Phong, Bui Tuong, "Illumination for Computer Generated Pictures," Communication of the ACM, 18(6), pp. 311-317, Jun. 1975.

Blinn, J.F., "Models of Light Reflection for Computer Synthesized Pictures," Proc. Siggraph 1977, Computer Graphics 11(2), pp. 92-198, Jul. 1977.

Blinn, J.F., "Light Reflection Functions for Stimulation of Clouds and Dusty Surfaces," ACM Graphics, vol. 16, No. 3, Jul. 1982.

Rushmeier et al., "Extending the Radiosity Method to Include Specularly Reflecting and Translucent Materialsm" ACM Transaction on Graphics, vol. 9, No. 1, Jan. 19.

Schlicke, C., "A Fast Alternative to Phong's Specular Model," Graphics Gems IV, pp. 385-386, 1994.

* cited by examiner

ENVIRONMENT MAPPING

CROSS-REFERENCE TO RELATED APPLICATIONS

This application is a continuation and claims the priority benefit of U.S. patent application Ser. No. 10/267,341 filed Oct. 8, 2002 now U.S. Pat. No. 7,046,245 and entitled "System and Method for Environment Mapping," which claims the priority benefit of U.S. provisional patent application No. 60/328,490 filed Oct. 10, 2001 and entitled "Environment Mapping." The disclosure of these applications is incorporated herein by reference.

BACKGROUND OF THE INVENTION

1. Field of the Invention

This invention relates generally to computer generated images and more particularly to a system and method for environment mapping.

2. Description of the Background Art

Typically, the illumination of a computer-generated object by discrete light sources, continuous light sources, and ambient light is described by an illumination model. The object is illuminated by the reflection of ambient light and the reflection of light source light from the surface of the object. Generally, the illumination model is a mathematical expression that operates on a set of variables to generate reflection properties, such as color and intensity of reflected light and an object's texture as viewed by an observer. Given ambient light and light sources positioned about the object, the illumination model defines the reflection properties of the object. The illumination model is considered to be accurate if the illuminated object appears realistic to an observer.

Typically, the illumination model is incorporated in a software program executed by a vector processing unit, a central processing unit, or a rendering engine of a computer system. The program must be capable of computing the illumination of the object when the light sources change position with respect to the object, when the observer views the illuminated object from a different angle, or when the object is rotated. Furthermore, an efficient illumination model is needed for the processing unit to compute the illumination in real-time, for example, if the observer (i.e., a camera) is moving with respect to the object. Therefore, it is desired to incorporate terms in the illumination model that are computationally cost effective, while at the same time generating an image of the illuminated object that is aesthetically pleasing to the observer.

Computing texture (i.e., environment mapping) is important when rendering a realistic image of the illuminated object that closely resembles a real physical object. Typically, texture coordinates for each point of the object's surface are computed, and a texture map comprising the texture coordinates is generated.

FIG. 1 illustrates a prior art direct normal projection method for computing an object's texture coordinates. FIG. 1 includes an object's surface 105, a point P on surface 105, a normal vector n to surface 105 at point P, an observer 110a, a line-of-sight 115a between observer 110a and the point P, and a projection of the normal vector n onto an x-axis 120, referred to as $n_x$. In general, a z-axis (not shown) is perpendicular to x-axis 120 and is in the plane of FIG. 1, and a y-axis (not shown) is perpendicular to x-axis 120 and the z-axis and is out of the plane of FIG. 1. For simplicity of illustration, the FIG. 1 embodiment of object's surface 105 is a line, however, surface 105 is typically any 2-D surface, and hence in general, the normal vector n may have a vector component $n_y$ along the y-axis.

In operation, the direct normal projection method computes the projected components $n_x$ and $n_y$ of the normal vector n for each point P on object's surface 105. The central processing unit or vector processing unit then maps (i.e., transforms) the projected components $n_x$ and $n_y$ into texture coordinates (s,t) using one or more mapping algorithms known in the art. The vector processing unit then uses the computed texture coordinates (s,t) for each point P, as well as other reflection variables, in an illumination model to generate a reflection pattern of object's surface 105. Although the direct normal projection method of the prior art may be fast, the method generates a reflection pattern that appears "painted-on" as observer 110a moves to different locations. In other words, the reflection pattern of object's surface 105 does not change with respect to rotation or translation of observer 110a, since the method depends upon the x and y components of the normal vector n, independent of the position of observer 110a with respect to the point P. For example, the vector processing unit computes the same projected components $(n_x,n_y)$ and texture coordinates (s,t) for an observer 110b viewing point P as observer 110a viewing point P.

It would be useful to implement a system and method of environment mapping that depends upon an observer's location with respect to an object's location and orientation to generate a more realistic reflection pattern, and that is consistent with results of the direct normal projection method for particular object-observer geometries.

SUMMARY OF THE INVENTION

In accordance with the present invention, a system and method for environment mapping of a reflective object is disclosed. In one embodiment of the invention, the method includes constructing a surface normal vector n at a point P on a surface of the reflective object, constructing an observation vector e from the point P to an observer, and using a modified reflection formula to compute a reflection vector r based on the surface normal vector n and the observation vector e. The modified reflection formula is based on reflection about a pseudo-normal vector n' at the point P on the surface.

According to the present invention, the pseudo-normal vector n' bisects an angle subtended by the surface normal vector n and a reference observation vector $e_o$, where the reference observation vector $e_o$ is directed from the point P to an observer located directly in front of the point P.

The modified reflection formula is:

$r=e-(e\cdot(n+e_o))(n+e_o)/(1-nz)=e-(e\cdot[nx, ny, nz-1])[nx, ny, nz-1]/(1-nz)$, where $e_o=[0,0,-1]$, and nx, ny, and nz are the components of the surface normal vector n. Each computed reflection vector r may be processed to generate a pair of texture coordinates (s,t). The reflective object is then rendered based in part on the texture coordinates (s,t) associated with each point P on the surface of the reflective object. The scope of the present invention covers all types of rendering schemes, such as a polygon rendering where each point P on the surface of the reflective object is located at the vertex of a polygon.

In another embodiment of the invention, the system includes a memory configured to store a modified reflection model, a vector processing unit configured to compute reflection vectors using the modified reflection model, and a graphics processor configured to render the reflective object in an image. The quality of the image is dependent upon the texture coordinates that are derived from the computed reflection vectors.

DETAILED DESCRIPTION OF AN EMBODIMENT

The system and method for environment mapping described herein allow a computer-generated object's reflective appearance to change, based upon position and orientation of a camera with respect to the object's location. A position of the camera may be defined by a lateral location of the camera with respect to the object's location. Lateral camera movement is defined as motion to the right, left, up, or down with respect to the object's location. Camera orientation may be defined by rotation angles with respect to a given, fixed coordinate system.

An exemplary embodiment of the invention is implemented as a real-time environment mapping for polygon rendering. However, the scope of the invention covers other applications, such as environment mapping for other rendering schemes. Other rendering schemes may include, but are not limited to, point-based and non-polygon volume-based primitives. Various embodiments of the invention may be enabled in software, hardware, or firmware.

According to one embodiment of the invention, a central processing unit (CPU) and/or one or more vector processing units (VPUs) use illumination models to compute reflective properties of an object. The object's reflective properties are associated with the objects' appearance. Reflective properties include color and intensity of light reflected by the object, and texture of the reflective object. The texture of an object is associated with reflective properties such as the object's shininess and overall surface appearance. Typically, the object's texture is specified by texture coordinates (s,t) computed by the VPU. Texture coordinates may be incorporated into a texture map which is wrapped (i.e., mapped) around the object. For example, a VPU may execute environment mapping instructions that operate on variables stored in a VPU random access memory (RAM) or on variables stored in a CPU register to compute the texture coordinates. Typically the texture coordinates and the other computed reflective properties (also referred to as illumination terms) such as color and intensity are passed to a graphics processing unit (GPU) for further processing. Subsequently, the GPU prepares the reflective object for display on a display device such as a computer monitor.

Figure 1:
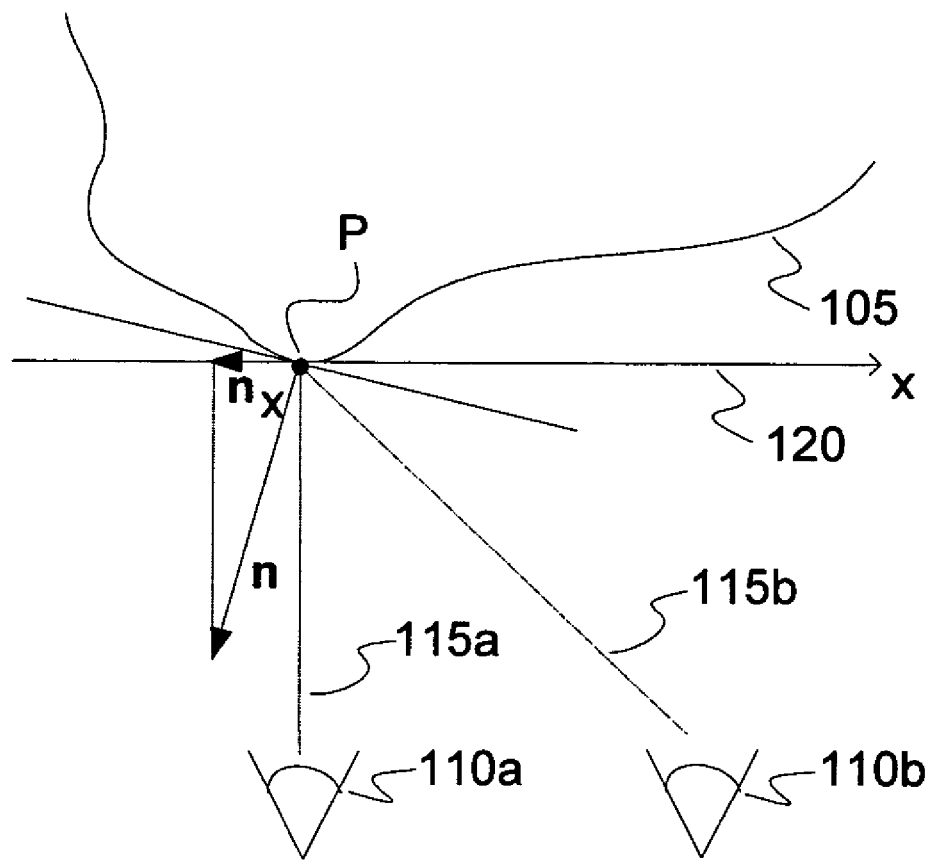
FIG. 1 illustrates a prior art direct normal projection method for computing an object's texture coordinates.
Figure 2:
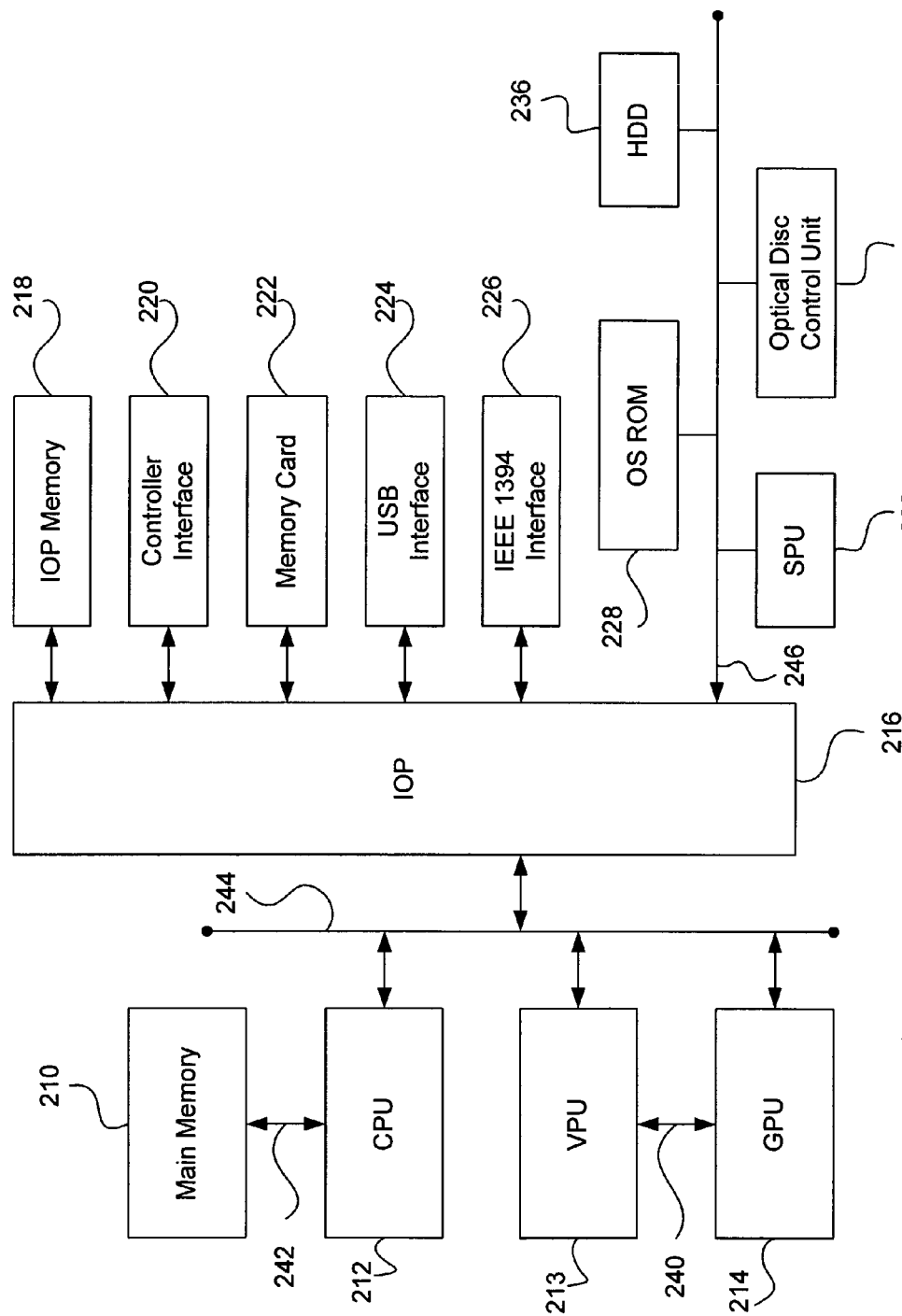
FIG. 2 is a block diagram of one embodiment of an electronic entertainment system according to the invention.

FIG. 2 is a block diagram of one embodiment of an electronic entertainment system 200 according to the invention. System 200 includes, but is not limited to, a main memory 210, a CPU 212, a VPU 213, a GPU 214, an input/output processor (IOP) 216, an IOP memory 218, a controller interface 220, a memory card 222, a Universal Serial Bus (USB) interface 224, and an IEEE 1394 interface 226. System 200 also includes an operating system read-only memory (OS ROM) 228, a sound processing unit (SPU) 232, an optical disc control unit 234, and a hard disc drive (HDD) 236, which are connected via a bus 246 to IOP 216.

CPU 212, VPU 213, GPU 214, and IOP 216 communicate via a system bus 244. CPU 212 communicates with main memory 210 via a dedicated bus 242. VPU 213 and GPU 214 may also communicate via a dedicated bus 240.

CPU 212 executes programs stored in OS ROM 228 and main memory 210. Main memory 210 may contain pre-stored programs and may also contain programs transferred via IOP 216 from a CD-ROM or DVD-ROM (not shown) using optical disc control unit 234. IOP 216 controls data exchanges between CPU 212, VPU 213, GPU 214 and other devices of system 200, such as controller interface 220.

Main memory 210 includes, but is not limited to, a program having game instructions including an illumination model. The program is preferably loaded from a DVD-ROM via optical disc control unit 234 into main memory 210. CPU 212, in conjunction with VPU 213, GPU 214, and SPU 232, executes game instructions and generates rendering instructions using inputs received from a user via controller interface 220. The user may also instruct CPU 212 to store certain game information on memory card 222. Other devices may be connected to system 200 via USB interface 224 and IEEE 1394 interface 226.

In one embodiment of the invention, VPU 213 executes instructions from CPU 212 to generate texture coordinates associated with an illuminated object by using the illumination model. SPU 232 executes instructions from CPU 212 to produce sound signals that are output on an audio device (not shown). GPU 214 executes rendering instructions from CPU 212 and VPU 213 to produce images for display on a display device (not shown). That is, GPU 214, using the texture coordinates and other illumination terms generated by VPU 213 and rendering instructions from CPU 212 renders the illuminated object in an image.

Figure 3:
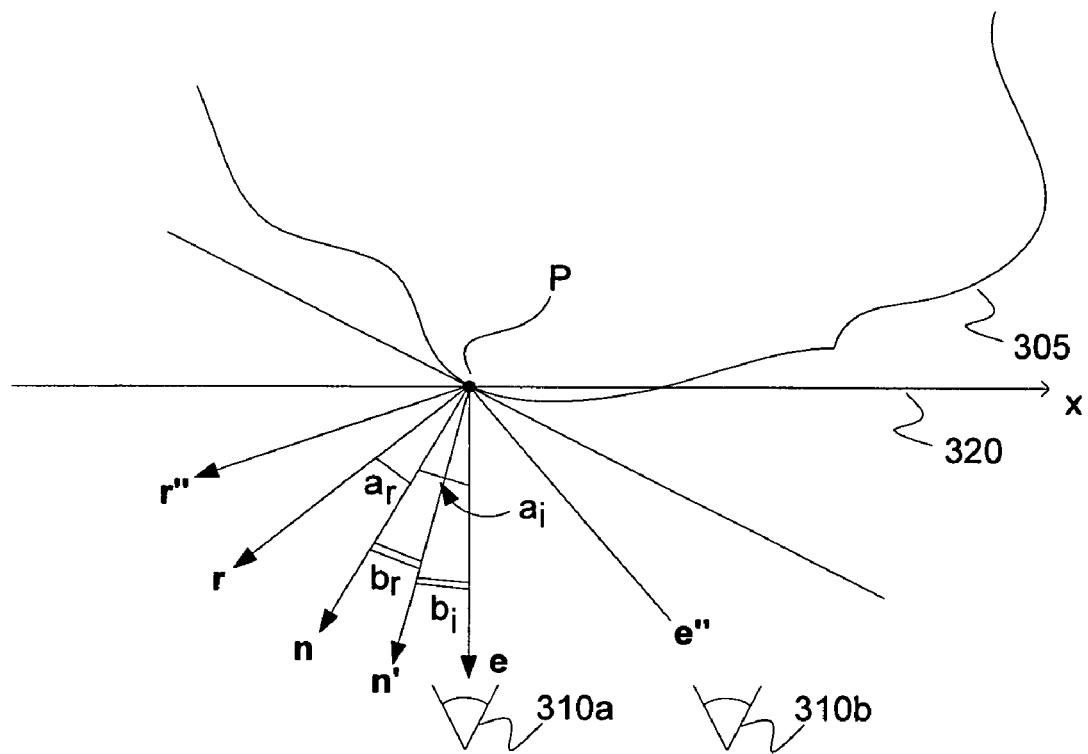
FIG. 3 illustrates a modified reflection projection method stored in main memory 210 of FIG. 2, according to one embodiment of the invention.

FIG. 3 illustrates a modified environment reflection projection method stored in main memory 210 of FIG. 2, according to the present invention. In one embodiment of the invention, the modified reflection projection method is used by the illumination model. In another embodiment of the invention, the modified reflection projection method is incorporated into the illumination model. FIG. 3 includes an object's surface 305, a point P on the surface 305, a normal vector n to the surface 305 at point P (also referred to as a surface normal vector), an observer 310a, an observation vector e directed from the point P to observer 310a, and an x-axis 320. In one embodiment of the invention, surface 305 is composed of polygon primitives (not shown), and at each vertex of each polygon, a point P is specified on surface 305. For future reference, the z-axis (not shown) is perpendicular to x-axis 320 and is in the plane of FIG. 3, and the y-axis (not shown) is perpendicular to x-axis 320 and the z-axis and is out of the plane of FIG. 3. For simplicity of illustration, the FIG. 3 embodiment of surface 305 is a line, however, any point P on any two-dimensional surface is within the scope of the invention. For example, the FIG. 3 embodiment of surface 305 may be the intersection of a two-dimensional surface (not shown) with the x-z plane, and thus the normal vector n may have a vector component $n_y$ along the y-axis.

According to one embodiment of the invention, the modified environment reflection projection method uses a modified version of a standard reflection formula to calculate a reflection vector r for each point P on surface 305. The method then processes the reflection vector r to generate texture coordinates (s,t) for each point P. The standard reflection formula is r=e−2(e·n)n. For each point P specified on surface 305 with a given normal n, the standard reflection formula gives a reflection vector r based upon a given observer position specified by the observation vector e. The standard reflection formula is a vector relationship that satisfies Snell's law of reflection, where the angle of incidence $a_i$ (FIG. 3) is equal to the angle of reflection $a_r$. (FIG. 3).

According to one embodiment of the invention, VPU 213 (FIG. 2) uses a modified version of the standard reflection formula to compute reflection vectors. For the point P on surface 305 located directly in front of observer 310$a$ (i.e., observation vector e intersects x-axis 320 at a right angle), the standard reflection formula is modified such that a reflection vector r' given by the modified reflection formula is equal to the normal vector n. That is, r'=n. Thus, the modified reflection projection method produces the same result as the direct normal projection method when the point P on surface 305 is located directly in front of observer 310$a$.

In order to modify the standard reflection formula, a pseudo-normal vector n' is defined that bisects the angle of incidence $a_i$ subtended by the observation vector e and the normal vector n. That is, n'=(e+n)/(|e+n|) where |e+n| is the magnitude of e+n, and angle $b_i$ is equal to angle $b_r$. When the pseudo-normal vector n' is substituted for the normal vector n in the standard reflection formula, the resultant modified reflection vector r' is equal to the normal vector n, since the modified reflection formula is based on the principle of Snell's law, where angle $b_i$=angle $b_r$. Thus, the modified reflection formula is expressed as r'=n=e−2(e·n')n'.

A simplification of the modified reflection formula is straightforward. Assuming that point P is located at (x,y,z)=(0,0,z), then the unit normal vector n has components [nx, ny, nz] and the unit observation vector e has components [0,0,−1], where brackets [ ] are used to specify vector quantities. For example, [nx, ny, nz] is another way of writing vector n. Now, substituting the components of n and e into the expression for n', one obtains n'=(e+n)/(|e+n|)=[nx, ny, nz−1]/(sqrt(nx$^2$+ny$^2$+(nz−1)$^2$)). Expanding the argument of the square root in the denominator, one obtains nx$^2$+ny$^2$+(nz−1)$^2$=nx$^2$+ny$^2$+nz$^2$+1−2nz=1+1−2nz=2(1−nz), since the normal vector n is a unit vector of magnitude one. If k≡1/sqrt(2(1−nz)), then n'=k [nx, ny, nz−1].

Now, substituting n' into the modified reflection formula, one obtains r'=n=e−2(e·n')n'=e31 2k$^2$(e·[nx, ny, nz−1])[nx, ny, nz−1]=e−(e·[nx, ny, nz−1])[nx, ny, nz−1]/(1−nz). That is, r'=e−(e·[nx, ny, nz−1])[nx, ny, nz−1]/(1−nz) for any given observation vector e. In other words, the modified reflection formula is valid for any given observation vector e=[ex, ey, ez], and any point P on surface 305 with an associated unit normal vector n=[nx, ny, nz]. For example, if observer 310$b$ views point P along an observation vector e", then VPU 213 uses the modified reflection formula to compute a reflection vector r", where r"=e"−(e"·[nx, ny, nz−1])[nx, ny, nz−1]/(1−nz).

The modified reflection formula may be simplified further, and expressed by a more compact mathematical relationship. For example, if the unit observation vector e=[0,0,−] is relabeled as a constant reference observation vector $e_o$, then the modified reflection formula may be written as r'=e−Ge·[nx, ny, nz−1])[nx, ny, nz−1]/(1−nz)=e−(e·(n+$e_o$))(n+$e_o$)/(1−nz).

Figure 4:
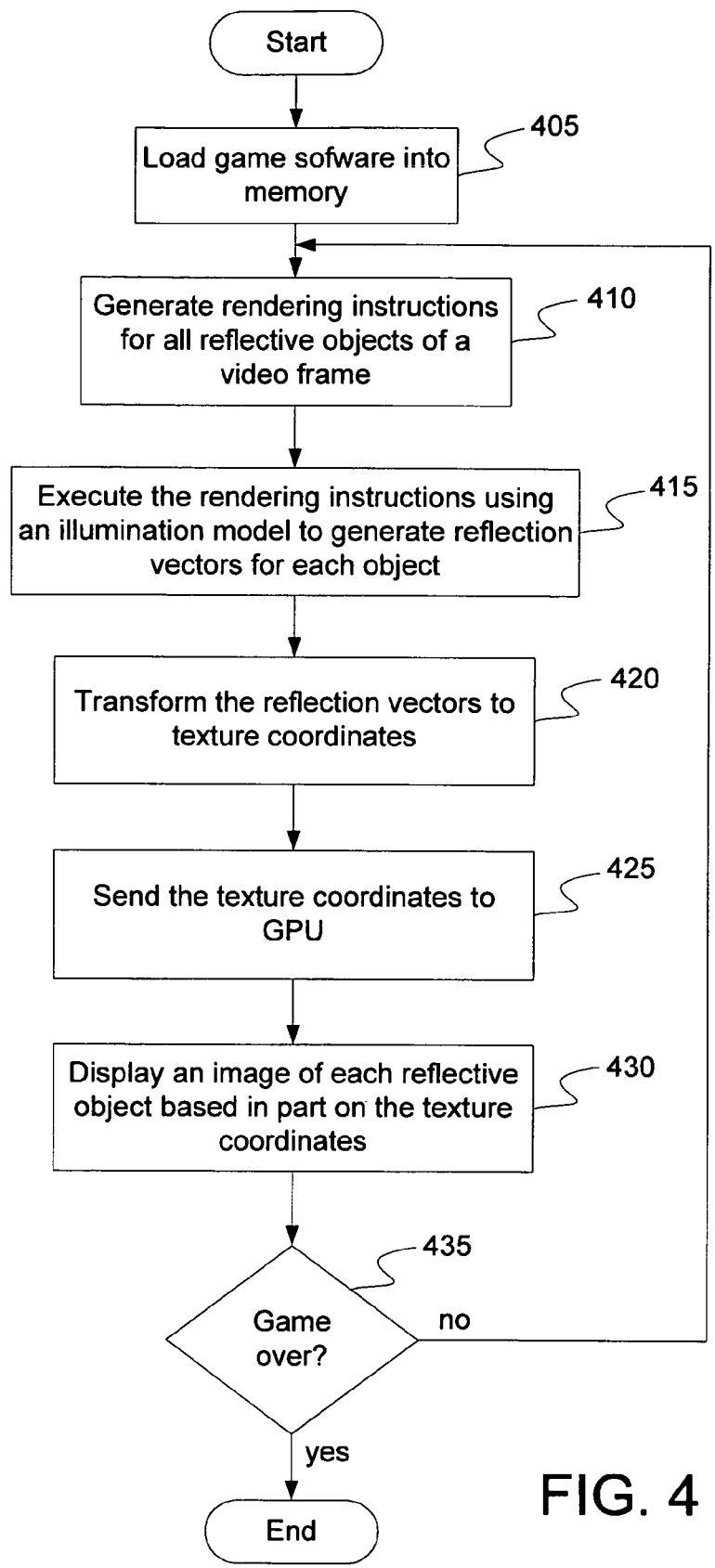
FIG. 4 is a flowchart of method steps for displaying an image of a reflective object based upon texture coordinates, according to one embodiment of the invention.

FIG. 4 is a flowchart of method steps for displaying an image of a reflective object based upon texture coordinates, according to one embodiment of the invention. In step 405, a user loads video software into memory 210 (FIG. 2) via optical disc control unit 234 (FIG. 2), for example, and CPU 212 (FIG. 2) executes the video software. The video software may be an interactive or non-interactive video, and in an exemplary embodiment of the invention, the video software is a video game. In step 410, CPU 212 generates rendering instructions for all reflective objects of a video frame. The rendering instructions may be generated in response to user input received via controller interface 220 (FIG. 2). In step 415, VPU 213 (FIG. 2) executes the rendering instructions using an illumination model, and generates reflection vectors for each reflective object of the video frame. For example, a reflection vector is generated for each vertex point P (FIG. 3) of surface 305 (FIG. 3). Step 415 is further discussed below in conjunction with FIG. 5.

In step 420, VPU 213 transforms the reflection vectors associated with each object to texture coordinates. The transformation may be a reflection vector mapping method, or may be configured using other known methods in the art. In addition, VPU 213 may compute a texture map composed of the texture coordinates for each reflective object. Next, in step 425, VPU 213 sends the texture coordinates and/or texture maps to GPU 214. In step 430, GPU 214 prepares an image of each reflective object for display on a display device (not shown), based in part on the texture coordinates or texture map associated with each reflective object. GPU 214 may use other illumination terms generated by VPU 213 or CPU 212 in conjunction with the texture coordinates to prepare each reflective object for display as an image.

Next, in step 435, CPU 212 determines if execution of the video game has been terminated. If execution has not terminated, then the method continues with the next video frame at step 410. However, if in step 435, CPU 212 ascertains that execution of the video game has terminated, then the method ends.

Figure 5:
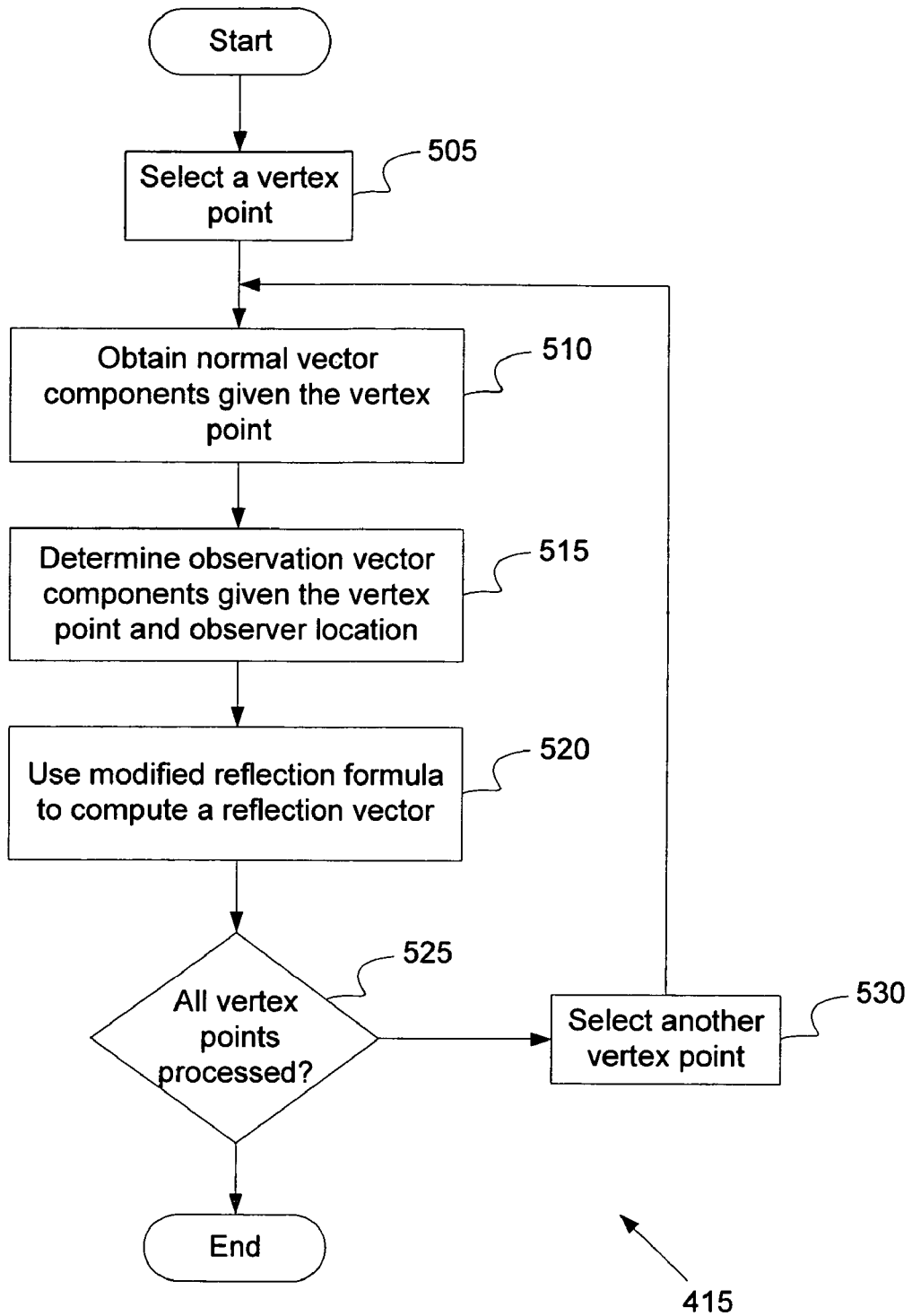
FIG. 5 is a flowchart of method steps for step 415 of FIG. 4 to generate reflection vectors for a reflective object, according to one embodiment of the invention.

FIG. 5 is a flowchart of method steps for generating reflection vectors for a reflective object, according to one embodiment of the invention. In step 505, VPU 213 (FIG. 2) selects a vertex point P (FIG. 3) on surface 305 (FIG. 3) of the reflective object. Next, in step 510, VPU 213 obtains vector components [nx,ny,nz] of a normal vector n (FIG. 3) to the surface 305 of the reflective object at the selected vertex point P. In one embodiment of the invention, the vector components are stored in registers (not shown) associated with CPU 212. In another embodiment of the invention, the vector components are stored in a memory (not shown) associated with VPU 213.

In step 515, VPU 213 determines components [ex",ey",ez"] of the observation vector e" (FIG. 3), for example, directed from the point P to observer 310$b$ (FIG. 3). VPU 213 may compute the components [ex",ey",ez"] or may receive the components from VPU 213 memory (not shown) or CPU 212 registers (not shown). Next, VPU 213 uses a modified reflection formula, the components (ex",ey",ez") of the observation vector e", and the vector components (nx,ny,nz) of the normal vector n to compute a reflection vector r" (FIG. 3), in step 520. In step 525, VPU 213 determines whether a reflection vector for each vertex point P associated with the reflective object has been computed. If a reflection vector for each vertex point P has not been computed, then in step 530, VPU 213 selects another vertex point P on surface 305 of the reflective object. The method then continues at step 510. However, if in step 525, a reflection vector for each vertex point P has been computed, then the method ends.

The invention has been explained above with reference to several embodiments. Other embodiments will be apparent to those skilled in the art in light of this disclosure. The present invention may readily be implemented using configurations other than those described in the embodiments above. For example, the modified environment reflection projection method, according to the invention, may be executed in part or in whole by CPU 212, VPU 213, GPU 214, or a rendering engine (not shown). Or, for example, the modified environment reflection projection method may be implemented in parallel by a multiprocessor system. Additionally, the present invention may effectively be used in conjunction with systems other than those described in the embodiments above. Therefore, these and other variations upon the disclosed embodiments are intended to be covered by the present invention, which is limited only by the appended claims.

What is claimed is:

1. A system for environment mapping of a reflective object, comprising:
    a memory configured to store a modified reflection model based on a reflection formula, wherein the reflection formula is modified by substituting pseudo-normal vectors for normal vectors, wherein the pseudo-normal vectors are defined as bisecting an observation vector directed to an observer and a normal vector, and the pseudo-normal vectors are located at points on a surface of the reflective object;
    a vector processing unit configured to compute reflection vectors using the modified reflection model; and
    a graphics processing unit configured to render the reflective object in an image, a quality of the image dependent upon the computed reflection vectors.

2. The system of claim 1, wherein the modified reflection model comprises the formula $r=e-(e\cdot[nx, ny, nz-1])[nx, ny, nz-1]/(1-nz)$, where nx, ny, and nz are components of a surface normal vector n at a point P on the reflective surface, and e is an observation vector directed from the point P to an observer.

3. The system of claim 1, wherein the vector processing unit is further configured to process each computed reflection vector to generate texture coordinates (s,t).

4. The system of claim 3, wherein the graphics processing unit uses the texture coordinates to render the reflective object as an image.

5. A method for environment mapping of a reflective object, comprising:
    building a reflection model, the reflection model based on a reflection formula, wherein the reflection formula is modified by substituting pseudo-normal vectors for normal vectors, wherein the pseudo-normal vectors are defined as bisecting an observation vector directed to an observer and a normal vector, and the pseudo-normal vectors are located at points on a surface of the reflective object;
    computing reflection vectors based on the modified reflection model using a vector processing unit; and
    rendering the reflective object in an image using a graphics processor.

6. The method of claim 5, wherein the quality of the image is dependent upon the computed reflection vectors.

7. The method of claim 5, further comprising processing the computed reflection vectors to generate texture coordinates.

8. The method of claim 7, wherein the texture coordinates are used to render the reflective object as an image.

9. The method of claim 7, wherein the texture coordinates are incorporated into a texture map.

10. A method for displaying an image of a reflective object, the reflective object comprising at least one surface, the method comprising:
    providing a video frame comprising the reflective object;
    executing rendering instructions for the reflective object based on an illumination model using a graphics processor, the illumination model comprising a modified reflection projection model based on a reflection formula, wherein the reflection formula is modified by substituting pseudo-normal vectors for normal vectors, wherein the pseudo-normal vectors are located at points on the at least one surface of the reflective object and are defined as bisecting an observation vector directed to an observer and a normal vector, whereby reflection vectors for the reflective object are generated;
    transforming the reflection vectors into texture coordinates using a vector processing unit; and
    preparing the image of the reflective object for display on a display device based upon the texture coordinates.

11. The method of claim 10, wherein the video frame is embodied in video game software.

12. The method of claim 10, wherein the rendering instructions are generated in response to user input.

13. The method of claim 10, wherein a reflection vector is generated for a vertex point on the at least one surface of the reflective object.

14. The method of claim 10, wherein transforming the reflection vectors into texture coordinates comprises the use of a reflection vector mapping method.

15. The method of claim 10, wherein the texture coordinates are part of a texture map of the reflective object.

16. The method of claim 10, wherein the generation of reflection vectors comprises:
    selecting a vertex point on the at least one surface of the reflective object;
    obtaining vector components of the normal vector to the at least one surface of the reflective object at the selected vertex point;
    determining components of the observation vector; and
    generating a reflection vector for each vertex point associated with the reflective object.

17. The method of claim 16, wherein the generation of reflection vectors further comprises:
    determining whether a reflection vector for each vertex point associated with the reflective object has been computed; and
    if a reflection vector for each vertex point associated with the reflective object has not been computed, selecting another vertex point on the at least one surface of the reflective object in order to compute a reflection vector for the another vertex point.

18. The method of claim 16, wherein the generation of the reflection vectors comprises the use of a modified reflection formula, components of an observation vector, and the vector components of the normal vector.

19. The method of claim 16, wherein the reflection vector components are stored in registers.

20. The method of claim 16, wherein the reflection vector components are stored in memory.

21. The method of claim 16, wherein the components of an observation vector are computed.

22. The method of claim 16, wherein the components of an observation vector are received from memory.

23. The method of claim 16, wherein the components of an observation vector are received from registers.

* * * * *